(12) United States Patent
Schwarz

(10) Patent No.: US 9,952,020 B2
(45) Date of Patent: Apr. 24, 2018

(54) ADAPTIVE VISUAL CAMOUFLAGE

(71) Applicant: SSZ Camouflage Technology AG, Zug (CH)

(72) Inventor: Rene Schwarz, Watt (CH)

(73) Assignee: SSZ CAMOUFLAGE TECHNOLOGY AG, Zug (CH)

( * ) Notice: Subject to any disclaimer, the term of this patent is extended or adjusted under 35 U.S.C. 154(b) by 249 days.

(21) Appl. No.: 14/427,369

(22) PCT Filed: Jul. 29, 2013

(86) PCT No.: PCT/EP2013/065861
§ 371 (c)(1),
(2) Date: Mar. 11, 2015

(87) PCT Pub. No.: WO2014/040786
PCT Pub. Date: Mar. 20, 2014

(65) Prior Publication Data
US 2015/0241176 A1    Aug. 27, 2015

(30) Foreign Application Priority Data
Sep. 17, 2012 (CH) ..................... 1681/12

(51) Int. Cl.
  *H04N 7/18*   (2006.01)
  *F41H 3/00*   (2006.01)
  *F41H 3/02*   (2006.01)

(52) U.S. Cl.
  CPC ............... *F41H 3/00* (2013.01); *F41H 3/02* (2013.01); *H04N 7/18* (2013.01)

(58) Field of Classification Search
None
See application file for complete search history.

(56) References Cited

U.S. PATENT DOCUMENTS

| 2004/0036006 | A1* | 2/2004 | Dowling | F41H 3/00 |
| | | | | 250/205 |
| 2005/0276955 | A1* | 12/2005 | Tooley | A41D 13/00 |
| | | | | 428/195.1 |
| 2007/0190368 | A1 | 8/2007 | Jung | |
| 2009/0154777 | A1 | 6/2009 | Cincotti | |
| 2009/0252913 | A1 | 10/2009 | Cincotti | |
| 2010/0088797 | A1 | 4/2010 | Simione | |
| 2011/0095692 | A1* | 4/2011 | Laycock | B63G 8/34 |
| | | | | 315/158 |

FOREIGN PATENT DOCUMENTS

| CH | 704144 A1 | 5/2012 |
| EP | 2386815 A2 | 11/2011 |

OTHER PUBLICATIONS

International Search Report for PCT/EP2013/065861 dated Oct. 24, 2013.
Written Opinion for PCT/EP2013/065861 dated Oct. 24, 2013.

* cited by examiner

*Primary Examiner* — Heather Jones
(74) *Attorney, Agent, or Firm* — Pearne & Gordon LLP

(57) ABSTRACT

In a method for visually adaptively camouflaging objects, the background and/or the surroundings in front of which and/or in which the object is situated are/is detected by means of a camera or a sensor array. The background and/or the surroundings thus detected are/is reproduced as an image (3) in a device for camouflaging the object.

13 Claims, 1 Drawing Sheet

ADAPTIVE VISUAL CAMOUFLAGE

Figure 1:
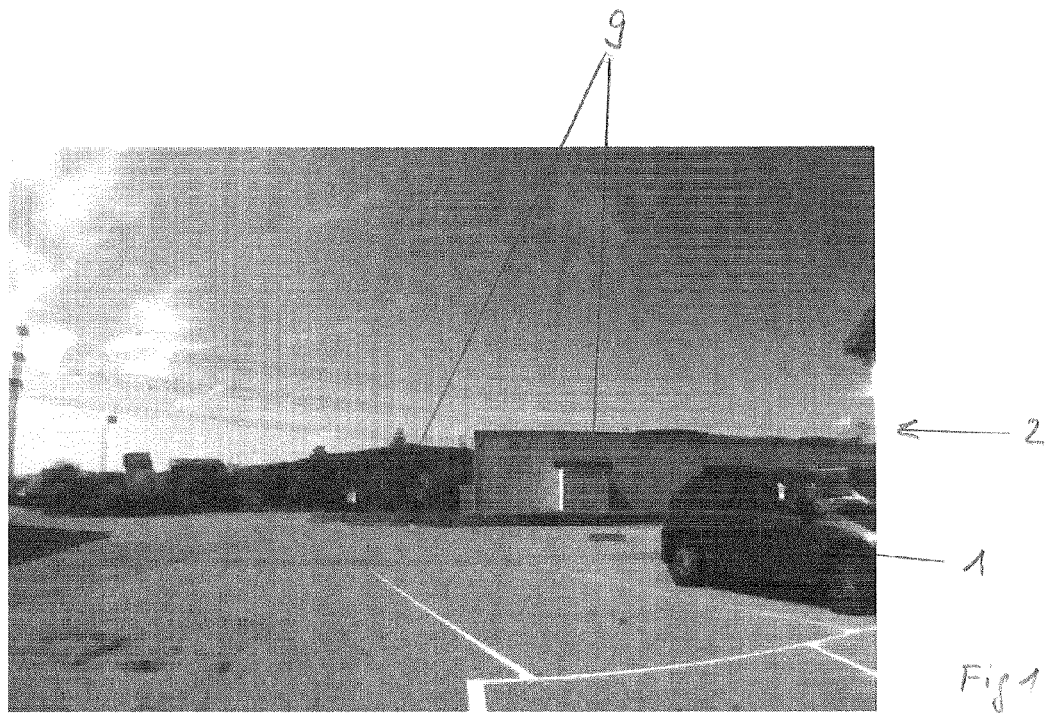

The present invention is related to a method for visually adaptively camouflaging of objects according to the preamble of claim 1 as well as to an arrangement for visually adaptively camouflaging.

The potential and effective use areas, especially in the military sector, were diversified in recent years, be it the use in urban terrain or the change of different climatic zones in a short time. On the one side, today's armies ask for the high standards regarding mobility. On the other hand, the technical capabilities of reconnaissance and target assignment have greatly expanded with the miniaturization of sensors and the emergence of new platforms, such as low-cost mini-drones. The requirement for effective camouflage rises therewith. In particular for camouflaging in urban area, extensive studies have been performed in recent years revealing that there is no truly universal camouflage pattern for this area. In order that camouflage is also taken seriously in the future and still can fulfill its task, a possibility for camouflage must be provided in urban terrain, which camouflage particularly is efficient in the visual range and in rapidly changing environment impressions resulting from moving objects, for example.

The object of the present invention is to provide an efficient camouflage of objects, especially in the visual field, for example, in urban environments where conventional universal camouflage patterns are largely useless.

According to the present invention, a method is provided for visually adaptively camouflaging of objects according to the wording of claim 1.

It is proposed that, for the visually adaptively camouflaging of objects, the background and/or the environment, in front of which or in which the object is located, is captured using a camera or a sensor array and is reproduced on a device for camouflaging the object as a computationally modified image.

It is proposed that signal data of the camera or sensor array are evaluated at least with respect to intensity and color in real time, and are input to a LED array, which LED array is mounted, for example, on a panel which is arranged on or in front of the object to be camouflaged. In other words, the signal data are evaluated in real time in terms of color and radiometry, for example, and serve as input for the LED array that is to reproduce, for example, the essential elements such as color and intensity of the original image. Since the position of the viewer in respect to the object being camouflaged is not known, the captured image may not be reproduced just as a one to one on the corresponding LED panel, otherwise the image sequence, such as the horizon, or perpendicular object features would never match with the background, i.e. no one to one presentation occurs on the LED panel. For example, the captured image can be calculated into a pattern, the captured image being divided into blocks comprising, for example, 4×4 pixels and these image blocks are placed at a different position in the image. A new random pattern is not calculated for each image because the output image would change each time even for non-changing image sequences. This, in turn, would be noticed by the viewer immediately because the object being camouflaged is not moving. Therewith, it is ensured that the output image only changes if the camera image changes.

Therewith, the software and control electronics evaluate the measured data online, for example, by reducing the resolution by averaging or segmentation and block by block randomization of the pixels and drives the LED array.

It is also proposed to provide an arrangement for visually adaptively camouflaging of objects according to the wording of claim 7, which has a panel-like means, in order to be arranged on or in front of the object being camouflaged, comprising the afore-mentioned LED array to reflect a modified image of the original image of the environment or of the background, in which or before which the object being camouflaged is positioned.

According to an embodiment, the LED array consists of strips or bundles of three LEDs at intervals of 3 cm to 10 cm, which are attached to each other in both dimensions. Furthermore, the arrangement comprises a camera or a sensor array for visually capturing the original image or the environment or the background, the captured signal data being used as input to the LED array. As a camera, a CMOS camera is used, for example.

The LED bundles or strips are, for example, attached in a width of 1 cm on an air-permeable fabric. This, for example, to combine visually adaptively camouflaging with an adaptive camouflage in the infrared range at the same time, as described in International Patent Application WO 2011/000679, for example.

Furthermore, the arrangement comprises a calculator and user software, including control interface and power supply unit in order to enter the evaluated data to the LED array in the panel.

The invention will now be explained in more detail by referring to the accompanying figures and to exemplified embodiments.

Figure 2:
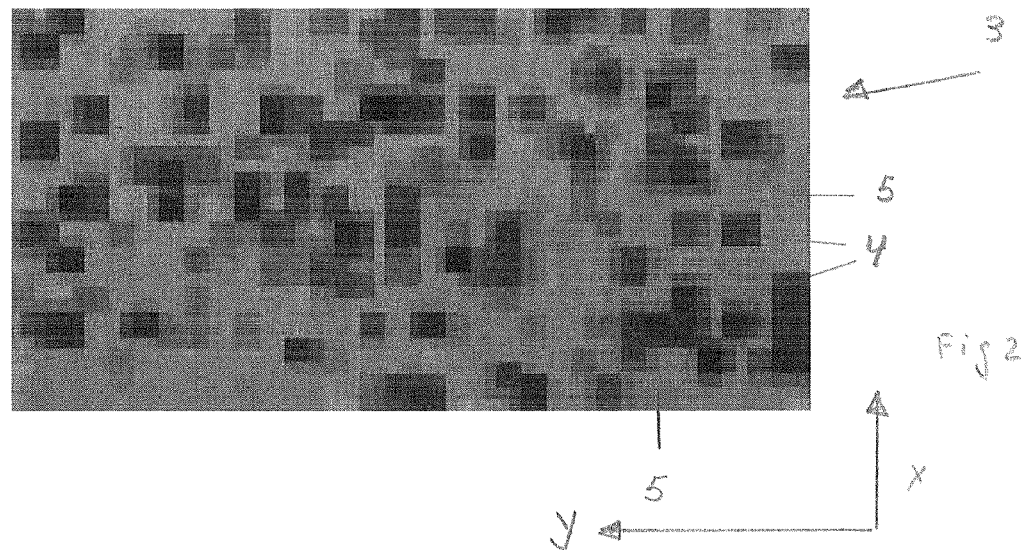

In the drawings:

FIG. 1 shows an object which is to be adaptively visually camouflaged in a terrain, and FIG. 2 schematically shows the visually adaptively camouflaging of the object of FIG. 1 by taking into account of the terrain according to the present invention.

FIG. 1 shows a parking area with, among others, a parked car 1, which is to capture at least visually in order to camouflage any military objects in this area. The camouflage is to take place by a panel 3, for example, on which LED array 4 proposed in accordance with the present invention extends in strips both in X- and in Y-direction 5 on the panel 3. Besides a military vehicle 1 to be camouflaged in the parking area 2, for example, further possible objects are present, such as other vehicles as well as houses in the background and terrain 9, which must be captured according to the present invention in order to be used as camouflage for the object 1.

FIG. 2 schematically shows the camouflage pattern 3 taking into account the parking area 2 to camouflage the object 1 in the parking area surrounding, which camouflage pattern is displayed on an LED panel. By the visual capturing of the parking area 2 and the objects 9, for example by means of cameras or another suitable sensor optic, they are visually depicted on the panel 3 with the LED-arrays 4. By the panel 3, the vehicle 1 can be camouflaged effectively.

First, an image is captured by a camera and read to the central computer for further processing.

In a first step, the image is calibrated in relation to intensity and color by look-up table or by modulation transfer function. Thereafter, the image is divided into blocks, which were randomized, as can be seen in FIG. 2. As the sky is usually disturbing, pixels, which can be assigned to the sky, will be replaced by average pixels from the background. The image is then transformed to the dimension of the corresponding LED arrays.

Thus, the exemplified vehicle 1 can efficiently be camouflaged in an urban environment, for example, by means of a panel 3 placed in front of the vehicle 1, by at least transferring the intensity and color of the environment to the object.

According to one embodiment, an LED grid is used having at least 3 cm to 10 cm distance in X- and Y-directions. As LED type, a multi-chip RGB (red-green-blue) is used, for example. The output is about 70 W/m².

The RGB LED strips must each be serially controlled. The image data, which can be pushed through the strips, are only displayed when the desired LED-position is reached. This must be done, for example, by a corresponding bus command.

The RGB LEDs are dimmable, for example, (8 bit, PWM) and the LED grid and the brightness correspond to the minimum requirement of 100 mm grid and about 70 W/m² per square meter.

The panel 3 with the LED array 4 is combined, in its function, with an IR-adaptive camouflage, as mentioned above and as already known from WO 2011/000679. The LED array is constructed such that individual LED strips having a width of about 1 cm are attached on an air-permeable fabric. The distance between the single lines is 3 cm to 10 cm. By having a sufficient distance between the lines, the air can still flow through the fabric. Thus, the functions of IR adaptive panels and LED strips can be combined to a system of IR-vis-adaptive camouflage system.

The camouflaging of objects schematically described in relation to FIG. 1 or 2 is only an example, which can be amended or changed in any way and manner of course, or which can be extended or completed by further objects being represented. Thus, also further objects, as phone booths, street lamps, waste containers, etc., can be visually captured in addition to the mentioned objects in order to be displayed on the panel with the aid of the LED-array. Furthermore, it is of course not mandatory to use a two-dimensional panel or fabric with the LED array, as described in connection with FIG. 2, but the camouflage arrangement can also be three-dimensional in correspondence with a three-dimensional object to be camouflaged. In the case of vehicle, the camouflage can be designed in a shell-like manner, adapted for the camouflage of a front or a rear part, for the camouflage of a side part or for the camouflage of the roof. It makes sense to offer basic shapes for the camouflage, which can be used to camouflage an object.

It is essential that the object to be camouflaged does not lift from the environment and, on the other hand, the panel used for camouflage is visually well adapted to the environment.

What is claimed is:

1. A method for visually adaptively camouflaging of objects, characterized in that the background and/or the environment (2), before which or in which the object (1) is positioned, is captured by using a camera or a sensor array to produce measured data which are evaluated by means of control electronics to determine a color and intensity of the background, and the measured data is converted into a block pattern by:
   segmentation of the measured data into blocks, each block containing multiple pixels;
   averaging the pixels of each block to reduce the resolution of the block;
   performing block by block randomization; and
   reproducing the block pattern on a device (3) for camouflaging the object at least in terms of intensity and color, by driving an LED array of the device.

2. The method according to claim 1, characterized in that the measured data are evaluated in color and radiometry and serve as input to the LED array, ensuring by calibration of the overall system, consisting of the camera or sensor array, the LED array and a panel, that at least the intensity of the background corresponds to an effective intensity emitted by the panel.

3. The method according to claim 1, characterized in that the measured data are evaluated in color and radiometry and serve as input to the LED array, ensuring by calibration of the overall system, consisting of the camera or sensor, the LED array and a panel, that at least the color of the background corresponds to an effective color emitted by the panel.

4. The method according to claim 1, characterized in that the data collected are evaluated in a calculator comprising user software and are fed to the LED panel via a driver interface and power supply unit.

5. The method according to claim 1, characterized in that an image is initially captured of the object to be camouflaged and the surrounding with a camera, that the captured image is read into a central computer for further processing, that, in a further step, the image is calibrated using look-up table or modulation transfer function in respect to the intensity and color, and that the image is then divided into blocks which are randomized.

6. The method according to claim 1, wherein the background and/or the environment comprises sky features and non-sky features, and wherein a portion of the measured data corresponding to sky features is replaced with measured data corresponding to non-sky features.

7. An arrangement for adaptively visually camouflaging objects by means of a method according to claim 1, said arrangement comprising a panel-like device, provided by or arranged in front of the object to be camouflaged, wherein the LED array reproduces a modified image in the form of the block pattern, said modified image being based on the original image of the environment or of the background, in which or in front of which the object to be camouflaged is positioned, wherein the measured data are evaluated by means of control electronics to determine a color and an intensity of the background, and the measured data is converted into the block pattern.

8. The arrangement of claim 7, characterized in that the LEDs are arranged in bundles or strips of 3 LEDs at intervals of about 3 cm to 10 cm.

9. The arrangement according to claim 8, characterized in that a so-called CMOS camera is used as camera.

10. The arrangement according to claim 7, characterized in that at least a camera or a sensor array is provided for visually recording the original image, wherein the captured signal data are used as input for the LED array.

11. The arrangement according to claim 7, characterized in that the LED strips having a width of approximately 1 cm are mounted on an air-permeable fabric and the distance between the individual lines is 3 cm to 10 cm, whereby a sufficient distance between the lines is obtained so that air can still flow through the fabric.

12. The arrangement according to claim 7, characterized in that the visual adaptive camouflage is combined with adaptive camouflage in the infrared region.

13. The arrangement according to claim 7, wherein the background and/or the environment comprises sky features and non-sky features, and wherein a first portion of the original image corresponding to sky features is replaced with a second portion of the original image corresponding to non-sky features.

* * * * *